United States Patent
Vibe-Pedersen et al.

(10) Patent No.: US 9,657,249 B2
(45) Date of Patent: May 23, 2017

(54) DEVICE AND METHODS FOR DISCHARGING PRETREATED BIOMASS FROM HIGHER TO LOWER PRESSURE REGIONS

(75) Inventors: Jakob Vibe-Pedersen, Billund (DK); Frank Krogh Iversen, Fredericia (DK)

(73) Assignee: INBICON A/S, Fredericia (DK)

( * ) Notice: Subject to any disclaimer, the term of this patent is extended or adjusted under 35 U.S.C. 154(b) by 189 days.

(21) Appl. No.: 12/996,392

(22) PCT Filed: Jun. 4, 2009

(86) PCT No.: PCT/IB2009/005850
§ 371 (c)(1),
(2), (4) Date: Feb. 16, 2011

(87) PCT Pub. No.: WO2009/147512
PCT Pub. Date: Dec. 10, 2009

(65) Prior Publication Data
US 2011/0147409 A1    Jun. 23, 2011

Related U.S. Application Data

(60) Provisional application No. 61/058,572, filed on Jun. 4, 2008.

(30) Foreign Application Priority Data

Jun. 4, 2008 (DK) .................. 2008 00771

(51) Int. Cl.
*B01F 5/00* (2006.01)
*B01F 15/02* (2006.01)
(Continued)

(52) U.S. Cl.
CPC .................. *C10L 5/44* (2013.01); *B01J 4/002* (2013.01); *C10J 3/506* (2013.01); *C10L 1/326* (2013.01);
(Continued)

(58) Field of Classification Search
CPC .... B01J 4/002; B01J 2204/005; B01F 5/0057; B01F 5/006; B01F 5/0068; B01F 5/0062;
(Continued)

(56) References Cited

U.S. PATENT DOCUMENTS 1,936,344 A * 11/1933 Bauch .............................. 352/32
2,858,213 A * 10/1958 Durant et al. .................. 162/17
(Continued)

FOREIGN PATENT DOCUMENTS

EP    0475930 A1    3/1992

OTHER PUBLICATIONS

Examination report for equivalent EP application No. 09757866.0.
Office action dated Dec. 26, 2013 in connection with equivalent Chinese application No. 200980120519.0, with translation.

*Primary Examiner* — Joseph Drodge
(74) *Attorney, Agent, or Firm* — Womble Carlyle Sandridge & Rice LLP

(57) ABSTRACT

Provided are devices and methods for discharging pretreated biomass from a pressurized reactor. Pretreated, hot biomass is added under high pressure at the top of a discharge vessel, which is partially filled with water or aqueous solution. The vessel comprises water jets situated on its sides through which water or aqueous solution is injected in order to establish a strong turbulence in the lower part of the vessel. This turbulence, preferably a vortex turbulence or "hydrocyclone," blends biomass and water and disintegrates any clumped material prior to its ejection at high speed as a slurry through an orifice or valve at the bottom of the vessel. A stable temperature stratification is established within the discharge vessel, whereby hot water remains at the top of the vessel, reducing heat and steam loss from the pretreatment reactor.

15 Claims, 3 Drawing Sheets

(51) Int. Cl.
  *B01J 4/00* (2006.01)
  *C10J 3/50* (2006.01)
  *C10L 1/32* (2006.01)
  *C10L 5/44* (2006.01)

(52) U.S. Cl.
  CPC ...... *B01J 2204/005* (2013.01); *C10J 2200/15* (2013.01); *C10J 2300/0903* (2013.01); *C10J 2300/0916* (2013.01); *Y02E 50/10* (2013.01); *Y02E 50/30* (2013.01)

(58) Field of Classification Search
  CPC ........ B01F 2015/00084; B01F 15/0292; B01F 15/0254; C10L 1/326; C10L 5/44; C10J 3/1506; C10J 2200/15; C10J 2300/0903; C10J 2300/0916; Y02E 50/10; Y02E 50/30; B67D 7/08

USPC ......... 127/38, 65; 210/257.1, 770, 787, 808, 210/112, 114, 194, 512.1, 533, 534, 739, 210/788, 800, 805; 137/14, 334, 395; 366/131, 137.1, 138, 165.1, 173.1, 173.2, 366/178.2, 184, 192, 737.1; 422/198, 422/207, 208, 242, 224; 162/6, 17, 57, 162/246, 248; 435/163, 165, 286.5, 435/286.7; 222/1, 64

See application file for complete search history.

(56) References Cited

U.S. PATENT DOCUMENTS

| | | | | |
|---|---|---|---|---|
| 2,977,201 | A | * | 3/1961 | Stephens ................. 422/648 |
| 3,015,554 | A | * | 1/1962 | Rummel .................. 75/533 |
| 4,177,066 | A | * | 12/1979 | Clumpner ................. 75/585 |
| 4,377,344 | A | * | 3/1983 | Hentschel et al. ......... 366/173.2 |
| 4,412,843 | A | | 11/1983 | Burgess et al. |
| 4,867,845 | A | * | 9/1989 | Elmore .................. 162/243 |
| 4,919,898 | A | * | 4/1990 | Gartside et al. ............. 422/219 |
| 5,093,084 | A | * | 3/1992 | Boden et al. .............. 422/133 |
| 5,192,396 | A | * | 3/1993 | Backlund ................ 162/18 |
| 5,344,554 | A | * | 9/1994 | Pontier et al. ............. 208/164 |
| 5,500,083 | A | * | 3/1996 | Johanson ................ 162/17 |
| 5,540,497 | A | * | 7/1996 | Addeo et al. ............. 366/159.1 |
| 5,622,598 | A | * | 4/1997 | Prough .................. D21C 7/06 162/238 |
| 5,628,873 | A | * | 5/1997 | Johanson et al. .............. 162/17 |
| 5,885,414 | A | * | 3/1999 | Lindstrom ............... D21C 3/24 162/19 |
| 6,006,954 | A | * | 12/1999 | Warby .................. 222/342 |
| 6,099,720 | A | * | 8/2000 | Pontier et al. ............. 208/113 |
| 6,497,791 | B1 | * | 12/2002 | Baker .................. 162/246 |
| 7,060,162 | B2 | * | 6/2006 | Baker .................. 162/237 |
| 7,300,584 | B2 | | 11/2007 | Langhans et al. |
| 7,531,142 | B2 | * | 5/2009 | Huziwara et al. ............ 422/143 |
| 7,556,713 | B2 | * | 7/2009 | Stromberg ............... 162/52 |
| 2002/0185176 | A1 | * | 12/2002 | Leavitt et al. ................ 137/154 |
| 2003/0006203 | A1 | * | 1/2003 | Romanyszyn et al. ....... 210/787 |
| 2005/0045298 | A1 | * | 3/2005 | Baker .................. 162/232 |
| 2007/0012229 | A1 | * | 1/2007 | Rehmat et al. .............. 110/229 |
| 2007/0196249 | A1 | * | 8/2007 | Fridman et al. .......... 422/186.04 |
| 2009/0267349 | A1 | * | 10/2009 | Spitzauer et al. ............. 290/52 |

\* cited by examiner

DEVICE AND METHODS FOR DISCHARGING PRETREATED BIOMASS FROM HIGHER TO LOWER PRESSURE REGIONS

FIELD OF THE INVENTION

The invention relates to means and methods for discharging biomass that have been subject to pressurized treatments into lower or atmospheric pressure regions.

BACKGROUND

An intense interest has arisen in fermentation and gasification of carbohydrate-rich biomass to provide alternatives to petrochemical sources for fuels, livestock feeds and for organic chemical precursors. Lignocellulosic biomasses including industrial and agricultural wastes have proved particularly interesting as carbohydrate sources. For lignocellulosic biomasses, pretreatment is generally required in order to separate lignin and hemicellulose from cellulose fibers and thereby increase catalytically effective access of hydrolytic enzymes. A variety of pretreatment processes have been reported, many of which rely on high temperature treatments at high pressures. For review, see ref. 1 and 2.

Discharge of pretreated biomasses from high pressure regions to subsequent processing at lower or atmospheric pressure presents a technical problem that has previously been solved by two general approaches. Particle pumps suitable for semi-continuous processing have been developed that provide pressure sealed-transfer of biomass from regions of different pressure. See for example, WO 03/013714, which is hereby incorporated by reference in entirety. Alternatively, in batch processing, discharge of pretreated biomass from high pressure regions has been achieved using "steam explosion," where biomass is literally blown out of a pressure treatment device into a blow tank. See for example U.S. Pat. No. 6,506,282. Previous solutions to the "discharge" problem have generally not been suitable for continuous biomass processing. In production scale, continuous processing is advantageous with respect of semi-continuous or batch processing in that the size of equipment can be reduced considerably, for example, between a factor of 2 and 5. Energy losses can also be minimized and troublesome energy pulses avoided through continuous processing.

Improvements of lignocellulosic biomass pretreatment processing are advantageous that reduce costs, particularly energy costs, or otherwise facilitate scale-up to production scale use.

We here describe devices and methods for discharging pretreated biomass from higher to lower pressure regions that are suitable for use in continuous biomass processing. Preferred embodiments provide reduced loss of steam from pressurized pretreatment regions, reduced energy consumption and simplified construction, relative to methods and devices known in the prior art.

SUMMARY OF THE INVENTION

Provided are devices and methods for discharging pretreated biomass from higher to lower pressure regions. Pretreated, hot biomass is added under high pressure at the top of the discharge vessel, which is partially filled with water or aqueous solution. The vessel comprises a plurality of water jets situated on its sides through which water or aqueous solution is injected in order to establish a strong turbulence in the lower part of the vessel. This turbulence, preferably a vortex turbulence or "hydrocyclone," blends biomass and water and disintegrates any clumped material prior to its ejection at high speed as a slurry through an orifice or valve at the bottom of the vessel. A stable temperature stratification is established within the discharge vessel, whereby hot water remains at the top of the vessel, reducing heat and steam loss from the pretreatment reactor.

DETAILED DESCRIPTION OF PREFERRED EMBODIMENTS

In some embodiments, the invention provides devices for discharging pretreated biomass from higher to lower pressure comprising
- a substantially cylindrical or conical discharge vessel having an opening to a high pressure region at the top
- a plurality of nozzles or jets situated along the sides of the vessel at a distance from the bottom corresponding to between 0 and 2 times the diameter of the vessel, through which water or liquid may be added, and
- an orifice or valve at the bottom of the vessel through which pretreated biomass may be ejected, optionally into a pipeline.

In other embodiments, the invention provides devices for discharging pretreated biomass from higher to lower pressure comprising
- a substantially cylindrical or conical discharge vessel having an opening to a high pressure region at the top
- at least one nozzle or jet situated along the sides of the vessel at a distance from the bottom corresponding to between 0 and 2 times the diameter of the vessel, through which water or liquid may be added, and
- an orifice or valve at the bottom of the vessel through which pretreated biomass may be ejected, optionally into a pipeline wherein the discharge vessel is filled with a quantity of water or aqueous solution comprising between ½ and ⅘ of its total internal volume.

In still other embodiments, the invention provides devices for discharging pretreated biomass from higher to lower pressure comprising
- a substantially cylindrical or conical discharge vessel having an opening to a high pressure region at the top
- at least one nozzle or jet situated along the sides of the vessel at a distance from the bottom corresponding to between 0 and 2 times the diameter of the vessel, through which water or liquid may be added, and
- an orifice or valve at the bottom of the vessel through which pretreated biomass may be ejected, optionally into a pipeline wherein a temperature gradient is established within the discharge vessel such that hot water remains at the top of the vessel.

In still other embodiments, the invention provides methods for discharging biomass from higher to lower pressure comprising
discharge of biomass through a device according to the invention.

Figure 1:
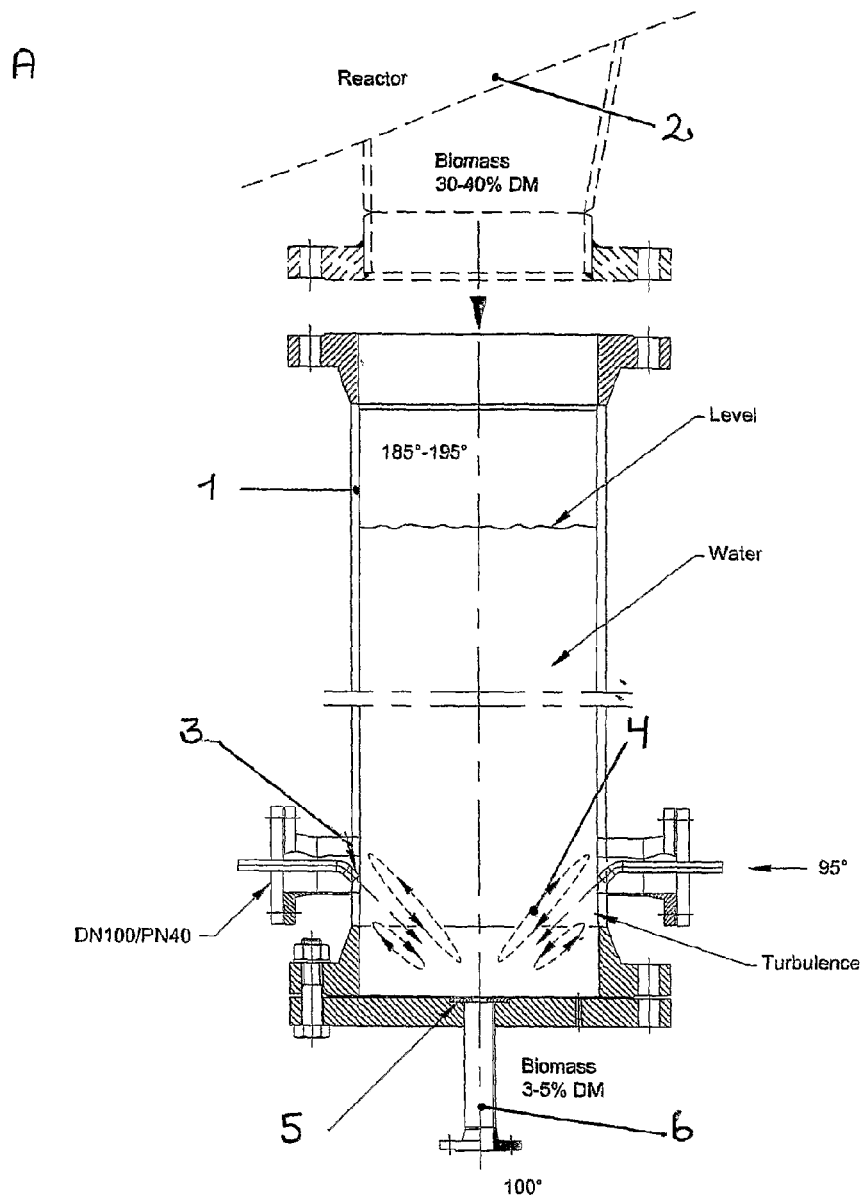
FIG. 1A shows a side view and 1B a top view of one embodiment of a device according to the invention.
Figure 1:
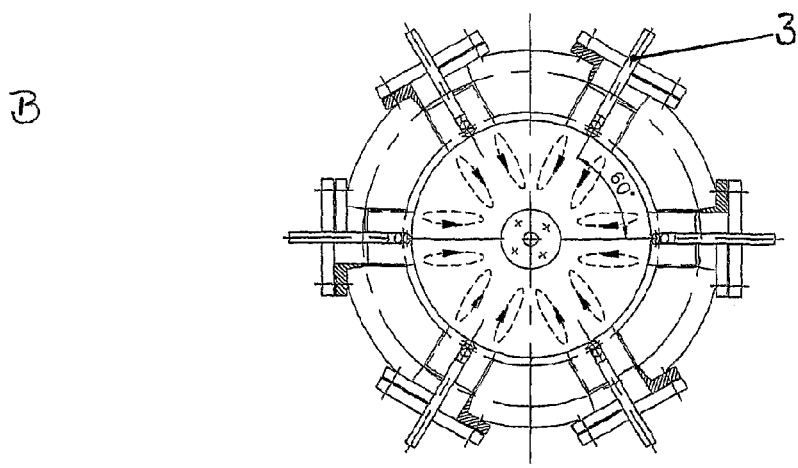

FIG. 1A shows a side view and 1B a top view of a preferred embodiment of a device according to the invention. As shown, the device comprises a cylindrical discharge vessel (1) and has an opening (2) to a high pressure region at the top, through which pretreated biomass is added. During use, the vessel is partially filled with water or aqueous solution and is fitted with 6 nozzles (3). Introduction of water or aqueous solution through the nozzles (3) establishes turbulence (4) around the outlet orifice (5). The outlet orifice (5) is in communication with a pipeline (6) through which ejected, pretreated biomass can be transported.

In some embodiments, the discharge vessel is fixed with pressurized sealing directly to a pressurized biomass pretreatment device. Alternatively, a pressurized biomass pretreatment device may be communicated to the discharge vessel by pipes or other means of conveyance.

The vessel itself is preferably substantially cylindrical or conical and may be of any size suited to the volume of use required. As used herein, the term "substantially cylindrical or conical" includes any combination of cylindrical and conical portions. For example, a discharge vessel that is cylindrical in the top portion and conical in the bottom portion is substantially cylindrical or conical as used herein. The term "diameter of the vessel" as used herein refers to the widest diameter. In preferred embodiments, the discharge vessel is suitable for use in production-scale biomass pretreatment and has a volume of at least 500 liters, or at least 700 liters, or at least 2000 liters. As used herein the "top" of the discharge vessel is the end connected with a pressurized biomass pretreatment device where the "bottom" is the end from which biomass is ejected. The orifice or valve through which biomass is ejected may be a single opening or multiple openings clustered in one general area. In some embodiments, more than one outlet orifice or valve may be used.

The discharge vessel is filled with a quantity of water or aqueous solution, preferably comprising between about ½ to about ⅔ of its total internal volume. In some embodiments, the discharge vessel may be filled to ⅘ of its total internal volume. Biomass is added at the top of the vessel at high temperature, typically between 160-210° C., and at high pressure, typically between 5 and 25 atmospheres. Ideally, the pretreated biomass should have sufficient density and/or other properties as to sink in the water or aqueous solution within the discharge vessel. In some cases, it may be advantageous to adjust the size of very long particles, such as grasses or straws, in order to achieve fast sedimentation.

In preferred embodiments, a plurality of water nozzles or jets are situated on the sides of the discharge vessel, preferably at a distance from the bottom of the vessel corresponding to about 0 to 2 times the vessel's widest diameter. These nozzles or jets serve at least two purposes—to establish a powerful turbulence, preferably a vortex, in the bottom part of the vessel and to prevent clogging of the discharge orifice or valve. In preferred embodiments, one or more nozzles or jets are directed at the discharge outlet at the bottom of the vessel and serve the purpose of preventing clogging of the outlet. In preferred embodiments, two or more nozzles or jets are projected into the center of the vessel, preferably at an angle downward of between about 20 to 60 degrees. As used herein the term projected refers to the angle at which water or liquid is introduced by nozzles or jets. Water or other liquid are injected through these nozzles or jets in such manner as to establish a powerful turbulence, preferably a vortex, in the lower part of the vessel. In preferred embodiments, the water or liquid injected through these nozzles or jets is slightly lower than boiling, preferably about 95° C. Alternatively, a plurality of nozzles or jets directed downward into the center of the vessel may serve simultaneously to establish a turbulence vortex and to prevent clogging. This turbulence disintegrates clumped material and thoroughly blends biomass with water. In still other embodiments, a single nozzle or jet may be used.

In preferred embodiments, the discharge vessel is oriented substantially vertically and the biomass sinks in the liquid to the bottom of the vessel. Alternative embodiments can comprise a more horizontal orientation of the discharge vessel. At least one outlet orifice or valve at the bottom of the vessel secures a drop in pressure as the water/biomass mixture is ejected at high speed, preferably into a pipeline that carries the mixture to further processing steps. The pressure drop alone is sufficient to drive the water/biomass mixture through a pipeline. Because the water in the pressurized region is at a temperature above boiling, compared with the pressure in other parts of the system, a mixture of biomass and water ejected from the discharge vessel contains fine steam bubbles which help ensure that transport of biomass through a pipeline will be without blockage.

Water/biomass mixture leaving the vessel typically release some steam due to flash evaporation on entering a lower pressure zone. In preferred embodiments, after transport through a pipeline to subsequent processing steps, the biomass is filtered from the water. Biomass can accordingly be pretreated at high dry matter, diluted into a slurry during discharge, then filtered back to an appropriate dry matter content for further processing. Water filtered from the slurry can be, in turn, recovered and recirculated back into the discharge vessel.

The liquid at the top of the discharge vessel is very hot, where heat is introduced by steaming biomass. At the bottom of the vessel, however, the liquid is comparatively cool. Some heat is transported downward through the liquid as the biomass is ejected. However, hot water floats on the top of cooler water, and a stable temperature stratification is established, such that most of the heat introduced by the added biomass remains at the top of the vessel. This temperature gradient, in turn, reduces heat loss from the pretreatment reactor and, accordingly, reduces energy consumption in production scale biomass processing.

Preferred embodiments are additionally advantageous in that the design and construction are simple, requiring relatively few mechanical parts and, accordingly, having a long useful life in production. Preferred embodiments further avoid the need for mechanical stirring that is typically encountered with steam explosion systems.

In some instances, clumped biomass or variations in biomass quality, particularly with very long fibers or twigs, can accumulate in such manner as to block the outlet orifice or valve at the bottom of the vessel. This can be remedied by backpulsing with water and/or by use of a simple mechanical device to scrape, cut or otherwise clear around the orifice or valve. In preferred embodiments, a device according to the invention can be fitted with backpulse and/or mechanical means for keeping the orifice or valve clear.

In typical use of preferred embodiments, the level of water or aqueous solution within the discharge vessel fluctuates. Fluctuations of level may be controlled in some embodiments by adjusting the opening of the outlet orifice or valve and/or the rate of flow introduced through nozzles or jets. In some embodiments, a steady-state level may be maintained by a continuous valve that adjusts the outlet orifice.

In preferred embodiments, a device according to the invention can be used in continuous biomass processing. As used herein, the term "continuous processing" refers to a non-pulsatile, relatively constant flow of feedstock through processing steps.

Figure 2:
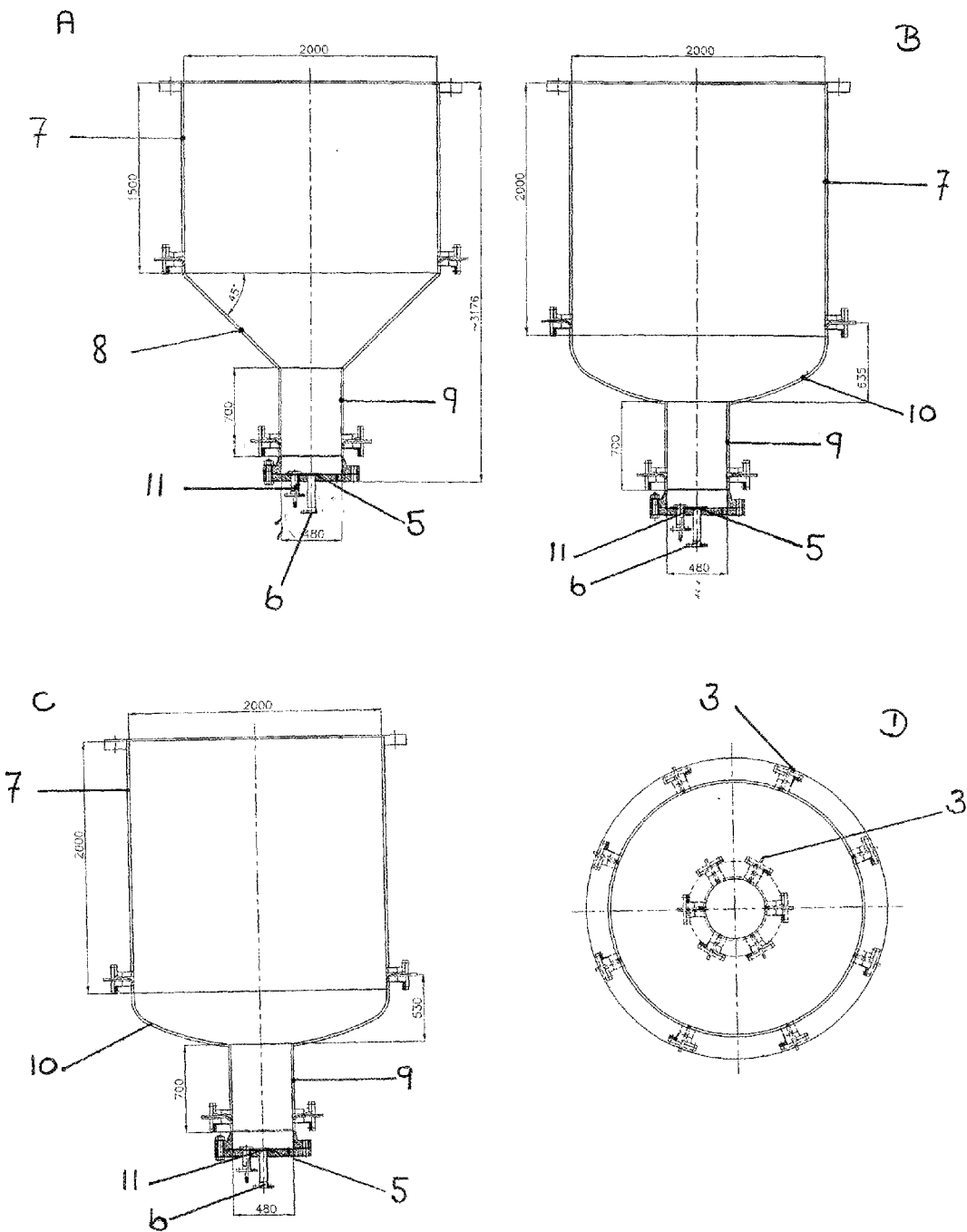
FIGS. 2A, 2B, and 2C show side views and 2D a top view of alternative embodiments of devices according to the invention.
Figure 3:
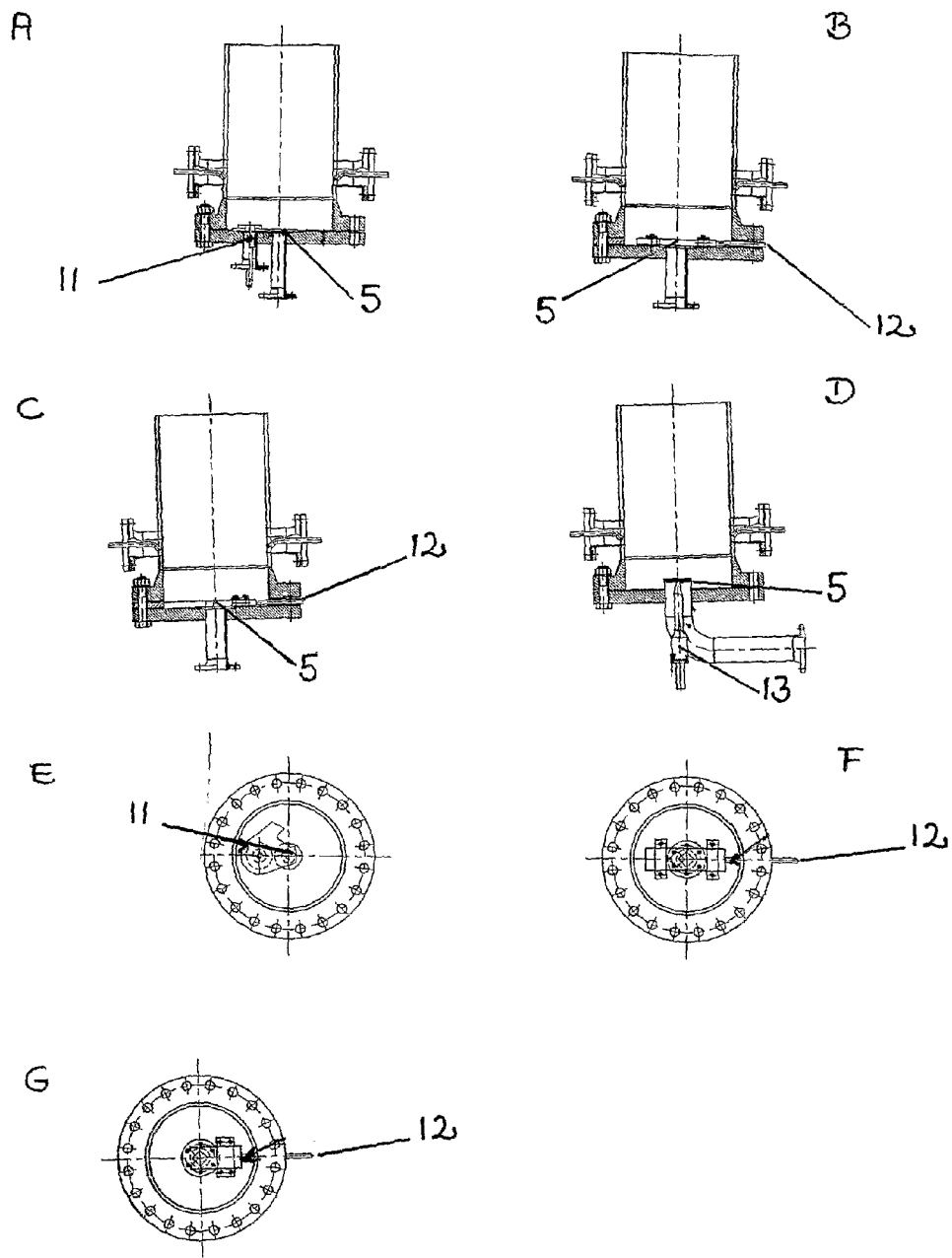
FIGS. 3A, 3B, 3C, and 3D show side views and 3E, 3F, and 3G top views of devices according to the invention having mechanical means for keeping clear the outlet orifice.

FIGS. 2A, 2B, and 2C show side views and 2D a top view of alternative embodiments of devices according to the invention. The device shown in FIG. 2A comprises a discharge vessel having a wide diameter cylindrical portion (7), a conical portion (8), and a narrow diameter cylindrical portion (9). The device shown in FIG. 2B comprises a discharge vessel having a wide diameter cylindrical portion (7), a curved, substantially conical portion (10), and a narrow diameter cylindrical portion (9). The device shown in FIG. 2C comprises a discharge vessel having a wide diameter cylindrical portion (7), a curved, substantially conical portion (10), and a narrow diameter cylindrical portion (9). As shown in the top view FIG. 2D, nozzles (3) are situated along the sides of the discharge vessel in both wide (7) and narrow (9) diameter cylindrical portions. The devices are further fitted with mechanical scraping means (11) for keeping clear the outlet orifice (5), which communicates with a pipeline (6).

FIGS. 3A, 3B, 3C, and 3D show side views and 3E, 3F, and 3G top views of devices according to the invention having alternative mechanical means for keeping clear the outlet orifice. The device shown in FIG. 3A comprises scraping means (11) which cuts across the outlet orifice (5) in a rotary manner, as illustrated in the top view FIG. 3E. The devices shown in FIG. 3B and FIG. 3C comprise scraping means (12) which cut across the outlet orifice with a horizontal motion, as illustrated in top views FIG. 3F and FIG. 3G. The device shown in FIG. 3D comprises a poking means (13) that rises through the outlet orifice (5). It will be readily understood that mechanical means for keeping clear the outlet orifice may, itself, act as a valve that can open or close the orifice.

EXAMPLE

A device according to the invention was tested at INBICON's pilot facility in Skærbæk, Denmark. The device comprised a substantially cylindrical discharge vessel about 2.0 meters in height and 0.5 m in diameter. The vessel had a volume of 390 l and was mounted on a pressurized biomass pretreatment reactor having capacity for processing 1000 kg of wheat straw per hour at temperatures up to 220° C. The device was tested using three different kinds of biomass feedstock—wheat straw, corn stover, and maize silage. In all cases, biomass was cut to sizes between 1 and 10 cm longest dimension and steam treated at between 185 and 195° C. In all cases, the device was operated with a water level of about 290 l in the discharge vessel. The water level in the vessel was controlled by a valve that acted to open and close the discharge outlet and that was regulated by a water level sensor set to turn on at 1.3 meters level and off at 1.5 meters level. The discharge outlet had a diameter of between 25 and 30 cm. Water was injected at 25° C. at the rate 3.6 m$^3$/hour into the vessel through three jets having a diameter of 4.2 mm. These jets were placed equidistant from each other around the circumference of the vessel, at a height of 0.25 m, oriented at an angle downward into the center of the vessel of 45°. With all three types of feedstock tested, the pretreated biomass could be unloaded from the pressurized reactor to atmospheric pressure without any problems. In all cases, a stable temperature gradient was established. At the top of the water column (1.5 meters) the temperature was equilibrated with the pressurized pretreatment reactor, 195° C. At the bottom of the water column, near the discharge outlet, the temperature was 35° C.

The examples and preferred embodiments described herein are representative only and in no way intended to limit the scope of the invention as defined by the claims herein.

REFERENCES

1 Y. Sun and J. Cheng, "Hydrolysis of lignocellulosic materials for ethanol production: a review", Bioresource Technology (2002) 83:1.
2 Felby, C., Klinke, H. B, Olsen, H. S, et al., "Ethanol from wheat straw cellulose by wet oxidation pretreatment and simultaneous saccharification and fermentation, APPLICATIONS OF ENZYMES TO LIGNOCELLULOSICS, Volume: 855, Pages: 157-174, Published: 2003.

The invention claimed is:

1. A device for discharging pretreated lignocellulosic biomass from a pressurised biomass pretreatment device at high pressure, comprising
   a substantially cylindrical or conical vessel fitted at the top with pressurised sealing directly to a pressurised biomass pretreatment device through which pretreated biomass can be conveyed at the top of the vessel while maintaining pressures between 5 and 25 atmospheres,
   a plurality of water or aqueous nozzles or water or aqueous jets situated along the sides of the vessel at a distance from the bottom corresponding to between 0 and 2 times the diameter of the vessel, with two or more nozzles or jets projected into the center of the vessel at an angle downward of between 20 and 60 degrees, such that the water or aqueous nozzles or water or aqueous jets provide a vortex turbulence during operation, and
   one or more valves at the bottom of the vessel,
   wherein said vessel is capable of being filled with water or aqueous solution between ½ and ⅘ of the internal volume during operation as controlled by operation or adjustment of said one or more valves responsive to level of water or aqueous solution in the vessel,
   wherein the level of water or aqueous solution is higher than said plurality of water or aqueous nozzles or water or aqueous jets during operation.

2. A device according to claim 1 comprising an internal volume of at least 500 liters.

3. A device according to claim 1 wherein said one or more valves opens and closes the discharge outlet in response to a water level sensor.

4. A device according to claim 1 comprising a mechanical device to cut, scrape or otherwise clear around the one or more valves.

5. A device according to claim 1 comprising water or aqueous nozzles or water or aqueous jets.

6. A method for discharging biomass from higher to lower pressure comprising discharge of biomass through the device of claim 1.

7. A device according to claim 1 wherein the internal volume of the vessel is at least 2000 liters.

8. A device according to claim 1 further comprising a pipeline adapted to transport pretreated biomass from the one or more valves to further processing steps.

9. A method for discharging pretreated lignocellulosic biomass from a pressurised pretreatment reactor comprising discharge of pretreated biomass at pressures between 5 and 25 atmospheres from a pressurised pretreatment reactor into the device of claim 1 through the opening at the top of the vessel, wherein water or aqueous solution is added through one or more of the plurality of water or aqueous nozzles or water or aqueous jets such that the water or aqueous nozzles or water or aqueous jets provide a vortex turbulence during operation, and wherein the pretreated biomass is ejected through the one or more orifices or valves at the bottom of the vessel, wherein the discharge vessel is filled with a quantity of water or aqueous solution comprising between ½ and ⅘ of its total internal volume, and wherein the level of water or aqueous solution is higher than said plurality of water or aqueous nozzles or water or aqueous jets during operation.

10. The method of claim 9 wherein the discharge of lignocellulosic biomass is by a non-pulsatile, relatively constant flow.

11. The method of claim 9 wherein pretreated biomass is ejected as a slurry that is subsequently pressed to recover water which is subsequently recycled.

12. The method of claim 9 wherein water or liquid is added through water or aqueous nozzles or water or aqueous jets at a temperature of about 95° C.

13. The method of claim 9 wherein a stable temperature stratification is established such that the liquid at the top of the discharge vessel is very hot, where heat is introduced by steaming biomass, while the liquid at the bottom of the vessel is comparatively cool.

14. The method of claim 9 wherein vortex turbulence is established in the bottom part of the vessel.

15. The method of claim 9 wherein the pretreated biomass is ejected from the one or more orifices or valves through a pipeline to further processing steps, wherein the water content of the dry matter does not exceed 8% by weight.

* * * * *